United States Patent
Simsic et al.

(10) Patent No.: US 6,269,484 B1
(45) Date of Patent: Jul. 31, 2001

(54) METHOD AND APPARATUS FOR DE-INTERLACING INTERLACED CONTENT USING MOTION VECTORS IN COMPRESSED VIDEO STREAMS

(75) Inventors: Biljana D. Simsic; Philip L. Swan, both of Toronto (CA)

(73) Assignee: ATI Technologies, Thornhill (CA)

(*) Notice: Subject to any disclaimer, the term of this patent is extended or adjusted under 35 U.S.C. 154(b) by 0 days.

(21) Appl. No.: 08/876,031

(22) Filed: Jun. 24, 1997

(51) Int. Cl.7 .................................................. H04N 7/01

(52) U.S. Cl. ......................... 725/151; 348/448; 348/452; 348/699

(58) Field of Search .................................... 348/448, 452, 348/699, 700, 416, 417, 418; 725/151

(56) References Cited

U.S. PATENT DOCUMENTS

| | | |
|---|---|---|
| 4,669,100 | 5/1987 | Slotboom et al. |
| 4,750,057 | 6/1988 | Baumeister . |
| 4,800,436 | 1/1989 | Polaert et al. . |
| 4,881,125 * | 11/1989 | Krause .................................. 358/141 |
| 4,992,982 | 2/1991 | Steenhof . |
| 4,998,153 | 3/1991 | Kuyk et al. . |
| 5,101,403 | 3/1992 | Balzano . |
| 5,144,429 * | 9/1992 | Haghiri et al. ......................... 358/138 |
| 5,191,576 | 3/1993 | Pommier et al. . |
| 5,193,004 | 3/1993 | Wang et al. . |
| 5,305,104 * | 4/1994 | Jensen et al. ......................... 348/409 |
| 5,351,083 * | 9/1994 | Tsukagoshi ............................ 348/384 |
| 5,436,663 | 7/1995 | Guede . |
| 5,488,419 * | 1/1996 | Hui et al. .............................. 348/402 |
| 5,488,421 * | 1/1996 | Hwang et al. ......................... 348/448 |
| 5,532,750 | 7/1996 | De Haan et al. . |
| 5,600,731 * | 2/1997 | Sezan et al. ........................... 382/107 |
| 5,619,272 * | 4/1997 | Salmon et al. ........................ 348/452 |
| 5,621,481 * | 4/1997 | Yasuda et al. ........................ 348/452 |

(List continued on next page.)

OTHER PUBLICATIONS (Le Gall; Compression Standard for Multimedia Applications; Association for Computing Machinery; vol. 34, No. 4; pp. 51–53, Apr. 1991.*

ISO/IEC DIS 13818–2 Draft International Standard Information Technology—Generic coding of moving pictures and associated audio information—Part 2 Video, May 10, 1994, pp 1–194.

A. Murat Tekalp, "Digital Video Processing," Chapter 16—Standards Conversion, pp 302–330—1995.

* cited by examiner

*Primary Examiner*—Andrew Faile
*Assistant Examiner*—Reuben M. Brown
(74) *Attorney, Agent, or Firm*—Vedder, Price, Kaufman & Kammholz

(57) ABSTRACT

One embodiment of a de-interlacing device has a decoder that extracts decoding motion vector data for use in de-interlacing of decompressed picture data, from an MPEG-2 type compressed data stream containing interlaced decompressed picture data made up of macroblock of data. The de-interlacing device also has a video rendering device for receiving the extracted decoding motion vector data from the decoder. The decoder has a determinator for determining whether the macroblock of data contains motion based on the decoding motion vector data and at least a subset of the block of data. The decoder generates motion vector based de-interlacing information containing information indicating whether each macroblock contains motion or no motion and if desired, a level of confidence that the referenced data is suitable for a particular method of de-interlacing. The video rendering device de-interlaces the interlaced picture data on a macroblock of data basis by applying an adaptive motion filtering algorithm to the interlaced picture data for display on the progressive display device.

20 Claims, 8 Drawing Sheets

U.S. PATENT DOCUMENTS

| | | |
|---|---|---|
| 5,627,555 | 5/1997 | den Hollander . |
| 5,682,205 * | 10/1997 | Sezan et al. .......................... 348/452 |
| 5,689,305 * | 11/1997 | Ng et al. .............................. 348/416 |
| 5,724,098 * | 3/1998 | Murakami et al. .................. 348/416 |
| 5,774,593 * | 6/1998 | Zick et al. ........................... 382/236 |
| 5,784,115 * | 7/1998 | Bozdagi ............................... 348/452 |
| 5,793,435 * | 8/1998 | Ward et al. .......................... 348/448 |
| 5,844,614 * | 12/1998 | Chong et al. ........................ 348/420 |
| 5,929,913 * | 7/1999 | Etoh ..................................... 348/398 |
| 5,936,670 * | 8/1999 | Frencken ............................. 348/413 |
| 5,995,154 * | 11/1999 | Heimburger ........................ 348/448 |
| 6,037,986 * | 3/2000 | Zhang et al. ........................ 348/409 |

METHOD AND APPARATUS FOR DE-INTERLACING INTERLACED CONTENT USING MOTION VECTORS IN COMPRESSED VIDEO STREAMS

The invention relates generally to methods and devices for de-interlacing video for display on a progressive display and more particularly to methods and apparatus for de-interlacing interlaced content using decoding motion vector data from compressed video streams.

BACKGROUND OF THE INVENTION

For computer monitors that are mostly non-interlaced or progressive type display devices, video images or graphic images must be displayed by sequentially displaying each successive line of pixel data sequentially for a frame of an image. One frame of data is typically displayed on the screen 60 times per second. In contrast, interlaced display devices, such as television displays, typically display images using even and odd line interlacing. For example, where a frame of interlaced video consists of one field of even line data and one field of odd line data, typically each field is alternately displayed 30 times per second resulting in a complete frame being refreshed 30 times a second. However, progressive displays need to display a complete frame 60 times per second. Therefore when interlaced video is the video input for a progressive display, video rendering systems have to generate pixel data for scan lines that are not received in time for the next frame update. This process is called de-interlacing. When such interlaced signals are received for display on a progressive computer display, picture quality problems can arise especially when motion is occurring in the picture where inferior methods of de-interlacing are used.

The problem exists particularly for personal computers having multimedia capabilities since interlaced video information received from conventional video tapes, cable television broadcasters (CATV), digital video disks (DVD's) and direct broadcast satellite (DBS) systems must be de-interlaced for suitable display on a progressive (non-interlaced based) display device.

A current video compression standard, known as MPEG-2 and hereby incorporated by reference, specifies the compression format and decoding format for interlaced and non-interlaced video picture information. MPEG-2 video streams have picture data divided as blocks of data. These blocks of data are referred to as macroblocks in the MPEG-2 standard. Generally, a macroblock of data is a collection of Y, Cr, Cb (color space) blocks which have common motion parameters. Therefore, a macroblock of data contains a section of the luminance component and spatially corresponding chrominance components. A macroblock of data can either refer to source, decoded data or to the corresponding coded data elements. Typically, a macroblock of data (macroblocks) consists of blocks of 16 pixels by 16 pixels of Y data and 8 by 8, or 16 by 16 pixels of Cr and Cb data in one field or frame of picture data.

Generally, in MPEG-2 systems, two fields of a frame may be coded separately to form two field pictures. Alternatively, the two fields can be coded together as a frame. This is known generally as a frame picture. Both frame pictures and field pictures may be used in a single video sequence. A picture consists of a luminance matrix Y, and two chrominance matrices (Cb and Cr).

MPEG-2 video streams also include data known as motion vector data that is solely used by a decoder to efficiently decompress the encoded macroblock of data. A motion vector, referred to herein as a decoding motion vector, is a two-dimensional vector used for motion compensation that provides an offset from a coordinate position in a current picture to the coordinates in a reference picture. The decoder uses the decoding motion vector data stream to reference pixel data from frames already decoded so that more compact difference data can be sent instead of absolute data for those referenced pixels or macroblocks. In other words, the motion vector data is used to decompress the picture data in the video stream. Also, zero decoding motion vectors may indicate that there was no change in pixel data from a previously decoded picture.

In MPEG-2 video streams, decoding motion vectors are typically assigned to a high percentage of macroblocks. Macroblocks can be in either field pictures or frame pictures. When in a field picture it is field predicted. When in a frame picture, it can be field predicted and frame predicted.

A macroblock of data defined in the MPEG-2 standard includes among other things, macroblock mode data, decoding motion vector data and coded block pattern data. Macroblock mode data are bits that are analyzed for de-interlacing purposes. For example, macroblock mode data can include bits indicating whether the data is intracoded. Coded block pattern data are bits indicating which blocks are coded.

Intracoded macroblocks are blocks of data that are not temporarily predicted from a previously reconstructed picture. Non-intracoded macroblocks have a decoding motion vector(s) and are temporarily predicted from a previously reconstructed picture. In an MPEG-2 video stream, a picture structure can be either field coded or frame coded.

Several basic ways of de-interlacing interlaced video information include a "weave" method and a "bob" method. With the "weave", or merge method, successive even and odd fields are merged. Each frame to be displayed is constructed by interleaving the scan lines of a pair of fields. Generally, the result is that the frame rate is one-half the field display rate. This "weave" method is generally most effective with areas of a picture that do not have motion over successive frames because it provides more pixel data detail for non-moving objects. However, when motion does occur, artifacts appear in the form of double images of a moving object. Jagged edges appear around the periphery of a moving object causing poor image quality.

In contrast to the "weave" method, the "bob" method displays single fields as frames. The missing scan lines are interpolated from available lines in the file making the frame rate the same as the original field rate. This is sometimes referred to as intraframe de-interlacing. The most often used methods are line repetition, line averaging and edge-adaptive spatial interpolation. Again, this de-interlacing method is also not typically used with some form of motion detection so that non-moving images can appear to be blurry from loss of image detail. This can result from inaccurate interpolation of pixel data.

Another method of de-interlacing is known as motion adaptive filtering wherein different filtering (de-interlacing) strategies or algorithms are used in picture areas with and without motion. Generally, intraframe de-interlacing is used in picture areas with motion and field merging (weaving) is used in picture areas without motion. Coefficients in the adaptive filters are based on motion detection functions. However, such systems typically have to determine motion on a pixel by pixel basis from decoded picture information. This can add unnecessary computation time and cost. This is equivalent to using different filtering methods on different picture areas. Additional discussion on video processing techniques can be found in a book entitled "Digital Video Processing," written by A Murat Tekalp and published by Prentice Hall.

One proposed type of de-interlacing system for a video stream adds an additional assistance signal in the encoded stream which is then decoded in addition to decoding motion information. The additional assistance signal is transmitted to a special decoder in a vertical blanking interval. The additional assistance signal enables the decoder to choose from a number of predetermined de-interlacing modes. The use of an additional signal requires modification of the encoder and corresponding modification to the decoder.

Consequently, there exists a need for de-interlacing system for displaying interlaced content on a progressive display device that does not require the generation and sending of additional information about motion. There also exists a need for an MPEG-2 de-interlacing system that has a comparatively low computation complexity that can cost effectively improve display quality. Also, it would be advantageous to have a de-interlacing system for displaying interlaced content on a progressive display device wherein the improved system could be flexibly implemented by using software, hardware or a combination of software and hardware.

BRIEF DESCRIPTION OF THE DRAWINGS

The features of the present invention together with the advantages thereof, may be understood by reference to the following description taken in conjunction with the accompanying drawings wherein.

DETAILED DESCRIPTION OF THE INVENTION

The invention provides information to a de-interlacing device. To do this, the invention analyzes information in the encoded stream including motion vector data, and a subset of block of data. The result of the analysis helps to determine the type of de-interlacing to be used. Tag information, which may be in the form of a bitmap, is created that suggests the best de-interlacing method to use for each block. Bits in the bitmap can be a function of the motion vector data and confidence data reflecting a level of confidence that the referenced data is suitable for use in particular methods of de-interlacing. The bitmap is preferably generated by a decoder and transmitted to display hardware that renders the video image by applying the appropriate de-interlacing scheme based on the bitmap data. The invention finds particular use in systems having MPEG-2 video streams. However, it will be recognized that the disclosed invention can be used in systems other than those having MPEG-2 video streams. It will also be recognized that the de-interlacing related functions of the decoder and video rendering device may be suitably combined, separated or interchanged as desired.

Figure 1:
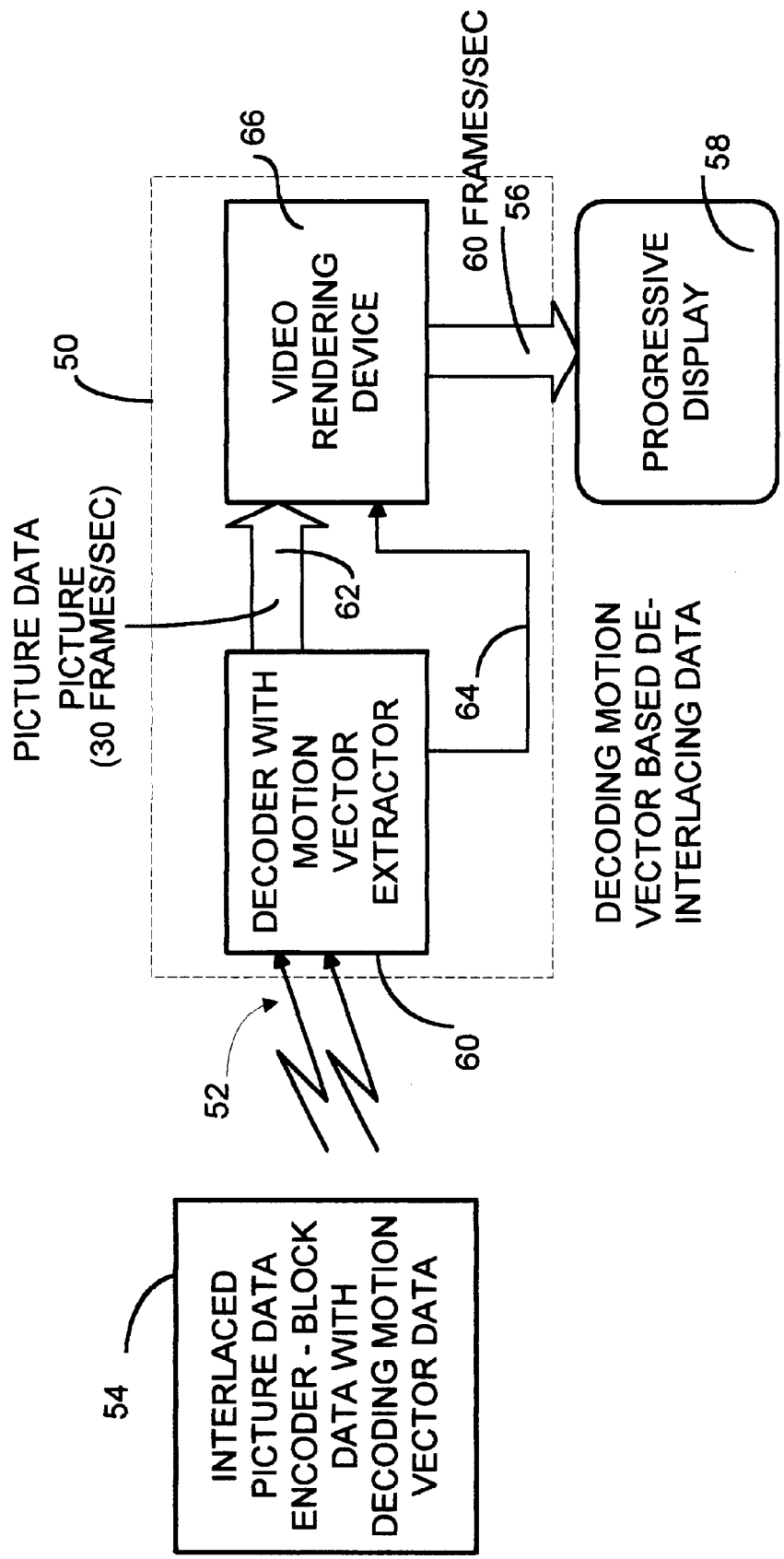
FIG. 1 is a block diagram generally depicting one embodiment of a de-interlacing system using decoding motion vector information in accordance with the invention.

FIG. 1 shows generally one embodiment of such a de-interlacing device 50 that receives a compressed data stream 52 from an interlaced picture data encoder 54, such as a conventional MPEG-2 encoder and outputs de-interlaced picture data 56 through a bus, to a progressive display device 58. As used herein, a picture can be either a frame or a field. The compressed data stream 52 contains encoded interlaced picture data, decoding motion vector data and blocks of data, such as that in an MPEG-2 compressed video stream. The de-interlacing device 50 preferably has a compressed data stream decoder 60 with a motion vector extractor that extracts decoding motion vector data from the compressed data stream 52 for use in de-interlacing of decompressed picture data. The data stream decoder 60 decodes the interlaced compressed video stream in a conventional manner using decoding motion vector data and outputs decoded interlaced picture data in the form of picture data 62, as known in the art.

In addition, the data stream decoder 60 performs motion detection by determining, on a block of data by block of data basis, whether each block of data contains motion, based on the decoding motion vector data, for use in de-interlacing. The data stream decoder 60 determines the proper de-interlacing method based on the decoding motion vector data and at least a subset of the block of data in stream 52, such as whether the block of data is intracoded (the type of block of data). The data stream decoder 60 also determines and generates decoding motion vector based de-interlacing data 64, such as a de-interlace bitmap. The decoded blocks of picture data 62 and decoding motion vector based de-interlacing data 64 are sent to a video rendering device 66.

The video rendering device 66 interprets the motion vector based de-interlacing data 64 and subsequently applies an adaptive motion filtering algorithm to the decoded blocks of picture data 62 containing motion, for display on the progressive display device 58. The decoded blocks of picture data 62 having no motion above a predetermined threshold are de-interlaced using a different de-interlacing method than block of data determined to have motion. A block of data may be determined to not have motion if it can not be determined that there was motion above the threshold. Although it is preferred that the data stream decoder 60 extracts the compression motion vector data and generates the decoding motion vector based de-interlacing data 64, it will be recognized by those having ordinary skill in the art, that the video rendering device 66 can be suitably modified to carry out the determination and generation (or any part thereof) of the decoding motion vector based de-interlacing data 64. Also, the decoder can be suitably modified to perform the adaptive motion filtering on a block of data basis and transfer the information to the video rendering device 66.

The de-interlacing device 50 may be flexibly implemented through software, hardware or a combination of both. Hence, the new functions of the decoder 60 and the video rendering device 66 as disclosed herein can be implemented through hardware circuitry or through software control.

Figure 2:
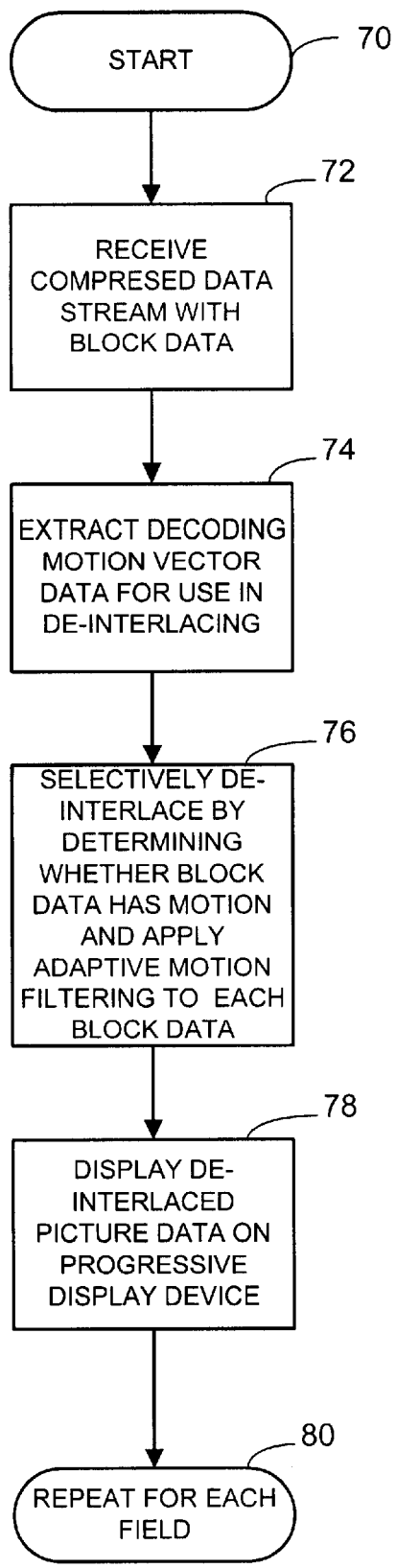
FIG. 2 is a flow diagram generally depicting a method for selectively de-interlacing interlaced video stream data using decoding motion vector information as a basis for determining a method of de-interlacing in accordance with the invention.

FIG. 2, generally illustrates a method for displaying interlaced content on a progressive display device carried out by the de-interlacing device 50 of FIG. 1. Referring to FIGS. 1 and 2, the de-interlacing device 50 is enabled to receive the compressed video stream 52 as shown in block 70. The decoder 60 receives the compressed data stream 52 containing an encoded interlaced picture data stream including decoding motion vector data and block of data, as indicated in block 72. Next, in block 74, the decoder 60 extracts the decoding motion vector data from the compressed data stream for use in both decoding of blocks of data and for later de-interlacing of the decompressed picture data. The decoder 60 in combination with the video rendering device 66 selectively de-interlaces the interlaced picture data on a block of data basis. The decoder 60 makes this determination based on the decoding motion vector data and at least a subset of the block of data, as shown in block 76.

As also shown in block 76, the video rendering device 66 subsequently applies an adaptive motion filtering algorithm to the decoded block of picture data 62. This is done for each block of data in a frame (or field). The adaptive motion filtering algorithm for de-interlacing includes the step of de-interlacing by applying a first de-interlacing technique for block of data containing motion and a second de-interlacing technique for block of data determined to contain no motion.

The progressive display device 58 then receives the de-interlaced picture data from the video rendering device 66 and displays the de-interlaced picture data as shown in block 78. This process is repeated for each picture frame (or field) transmitted in the video stream 52, as shown in block 80.

The step of applying an adaptive motion filtering algorithm, indicated in block 76, can be done using a variety of known algorithms. For example, where the de-interlacing device 50 determines that a block does not have motion, a conventional field merging technique can be used. Where the de-interlacing device 50 determines that block has motion, an intraframe de-interlacing technique may be used so that missing lines are interpolated from available lines in a field. Any suitable method of intraframe de-interlacing such as line repetition, line averaging and edge-adaptive spatial interpolation may be used. It will be recognized that hardware or software limitations may prohibit one or more of the techniques from being used. If a determination cannot be made, the video rendering device may attempt to make a determination through some other mechanism or may default to a particular de-interlacing method.

Figure 3:
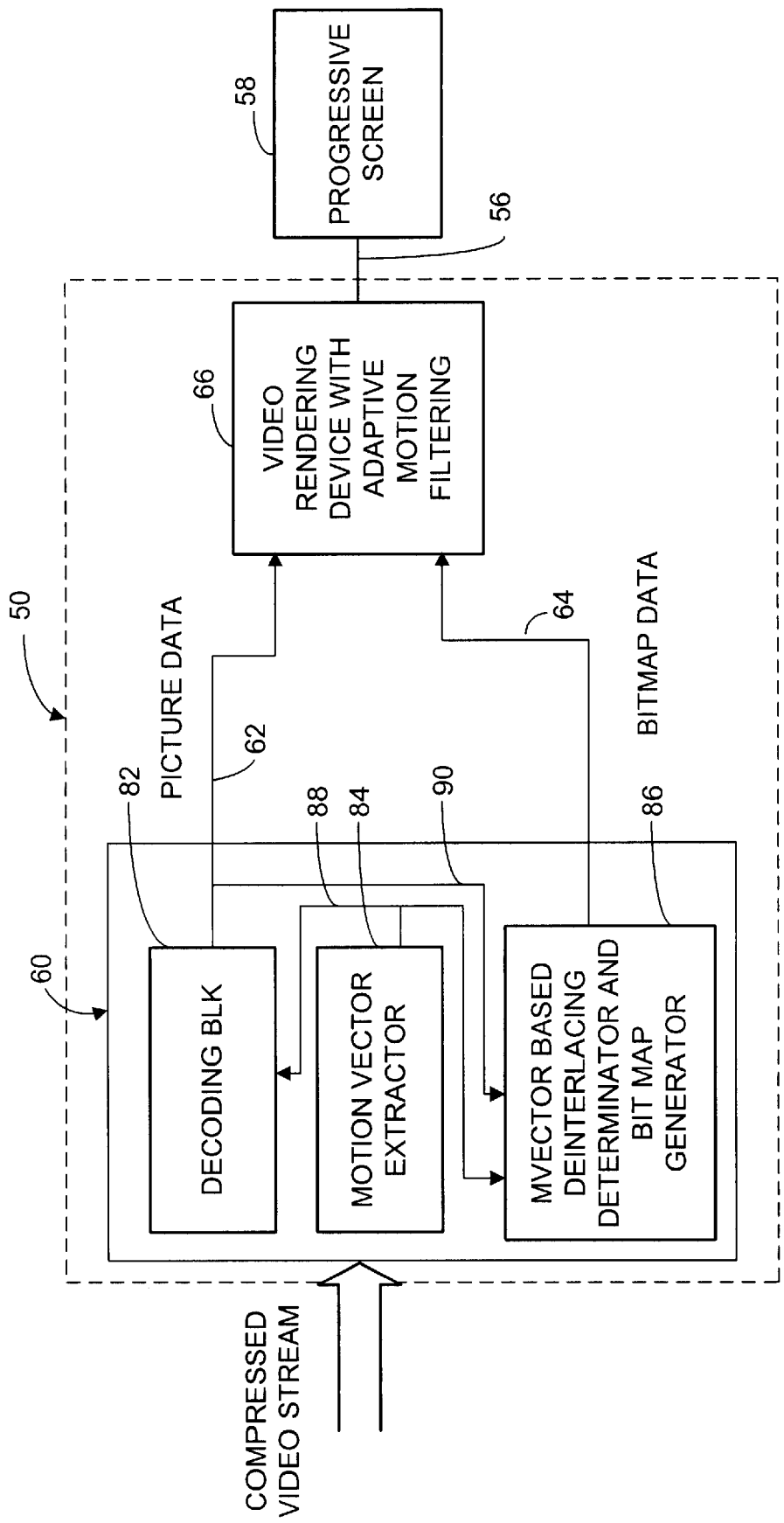
FIG. 3 is a more detailed block diagram of the de-interlacing device shown in FIG. 1.

FIG. 3 shows a more detailed block diagram of the decoder 60 shown in FIG. 1. The decoder 60 includes a conventional decoding block 82, a conventional motion vector extractor 84 for extracting decoding motion vector bits from the compressed stream 52, and a decoding motion vector based de-interlacing determinator and bitmap generator 86. As with conventional block of data decoders, motion vector extractor 84 extracts decoding motion vector data 88 which is used by the decoding block 82 to predict missing picture data as known in the art. Generally, the decoder block 82 serves as the entire decoder except for the decoding motion vector extraction section. The decoding motion vector data 88 also serves as an input to the motion vector based de-interlacing determinator and bitmap generator 86.

In addition to the decoding motion vector data 88, a subset of decoded block of data 90 is also input into the decoding motion vector based de-interlacing determinator and bitmap generator 86. The subset of block of data 90, includes a bit indicating the type of block of data, such as if the block of data is intracoded and block data itself. Also, as further described below, the subset of data can also include other data that provides a level of confidence that the referenced data is useful in de-interlacing.

The decoding motion vector based de-interlacing determinator and bitmap generator 86 evaluates each block of data to determine whether that block of data has motion as described below. Bitmap data 64 is generated for each block of data evaluated. A bit is assigned to each block of data to indicate whether that block of picture data contains motion. In a preferred embodiment a "1" is used to indicate that motion exists for a block of picture data, and a "0" is used to indicate that no motion has been determined for a block of picture data. The bitmap data 64 containing motion detection bit information resultant from the evaluation, is sent to the video rendering device 66 where it is processed to select how each block of data is de-interlaced. Hence, the selective de-interlacing is done in response to the corresponding bit value from the bitmap data 64 for that block of data.

The data in the bitmap can take any suitable form. Hence, a bitmap as used herein includes any format of data including table data, tag data or any data used by the de-interlacing mechanism to effect de-interlacing. In addition to being based on a motion vector value, the bitmap information may also be a function of motion vector values (or the existence/non-existence of motion vectors) and confidence level information that the referenced block is suitable for use in particular methods of de-interlacing.

Figure 4:
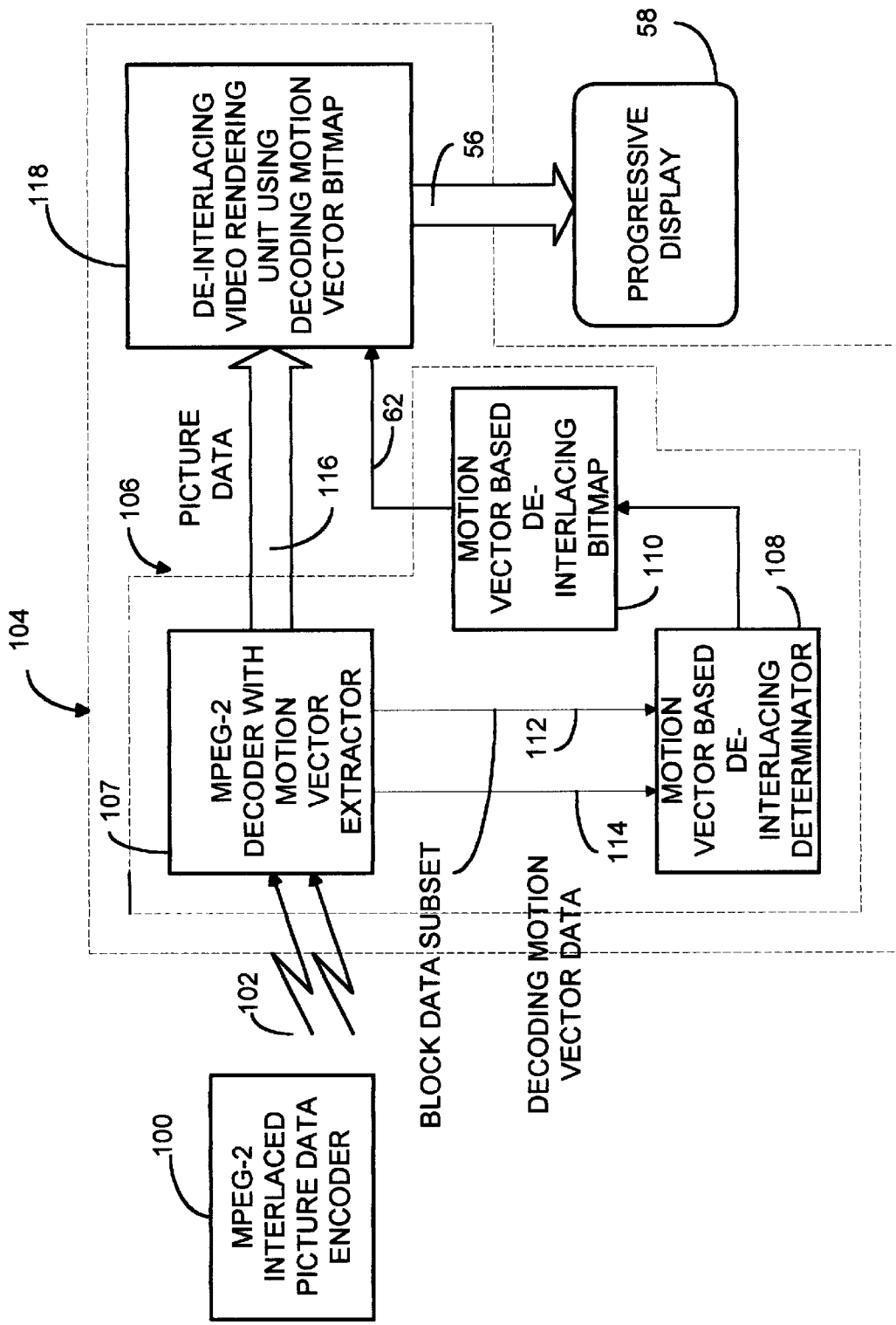
FIG. 4 is a block diagram generally showing the system of FIG. 1 applied to an MPEG-2 video stream in accordance with the invention.

FIG. 4 shows a block diagram of a more particularized de-interlacing device from that shown in FIGS. 1 and 3. The difference is that the compressed video stream is an MPEG-2 video stream, therefore the block of data is a macroblock. Like the encoder 54 of FIG. 1, an MPEG-2 encoder 100 encodes interlaced picture data according to the MPEG-2 standard. The encoded compressed MPEG-2 video stream 102 is transmitted to an MPEG-2 de-interlacing device 104 that is substantially identical to the de-interlacing device 50 (see FIG. 1 and FIG. 2) but that the data stream is an MPEG-2 type video stream so that the decoding mechanism and stream information is tailored for MPEG-2 video streams.

As with the data stream decoder 60 shown in FIG. 3, the de-interlacing device 104 includes an MPEG-2 data stream decoder 106 with a standard MPEG-2 decoding block 107 and a decoding motion vector data extraction unit. The MPEG-2 data stream decoder 106 also includes a decoding motion vector based de-interlacing determinator 108 and motion vector based de-interlacing bitmap 110. The MPEG-2 data stream decoder 106 conventionally extracts the decoding motion vector data and decodes MPEG-2 picture data.

The MPEG-2 decoder stage 107 with motion vector extractor outputs macroblock subset information 112, such as macroblock mode data, and decoding motion vector data 114 to the motion vector based de-interlacing determinator 108 as shown. The motion vector based de-interlacing determinator 108 analyzes block mode data, such as the type of macroblock, in the subset of the block of data to determine whether the block of data is intracoded and further analyzes the decoding motion vector to determine whether an associated block of data contains picture data that has motion. If intracoded, the macroblock is designated as having motion except when it is in an "I" picture. Therefore, like the motion vector based de-interlacing determinator and bitmap generator 86 (see FIG. 3), the motion vector based de-interlacing determinator 108 generates motion vector based de-interlacing bitmap 110 which contains bit representations of whether each macroblock contains motion or no motion for a given picture.

Also, the MPEG-2 decoder with motion vector extractor 107 decodes compressed macroblocks of data and outputs decompressed macroblocks of data 116, which is the macroblock picture data, to the de-interlacing video rendering unit 118. The de-interlacing video rendering unit 118 is substantially identical to the video rendering device 66 of FIGS. 1 and 3, but that the video stream is an MPEG-2 video stream. Therefore, the video rendering unit 118 uses the bitmap data 110 to determine how to apply adaptive motion filtering on a macroblock by macroblock basis to de-interlace picture data. The de-interlaced data is then output for display on progressive display 58.

Figure 5:
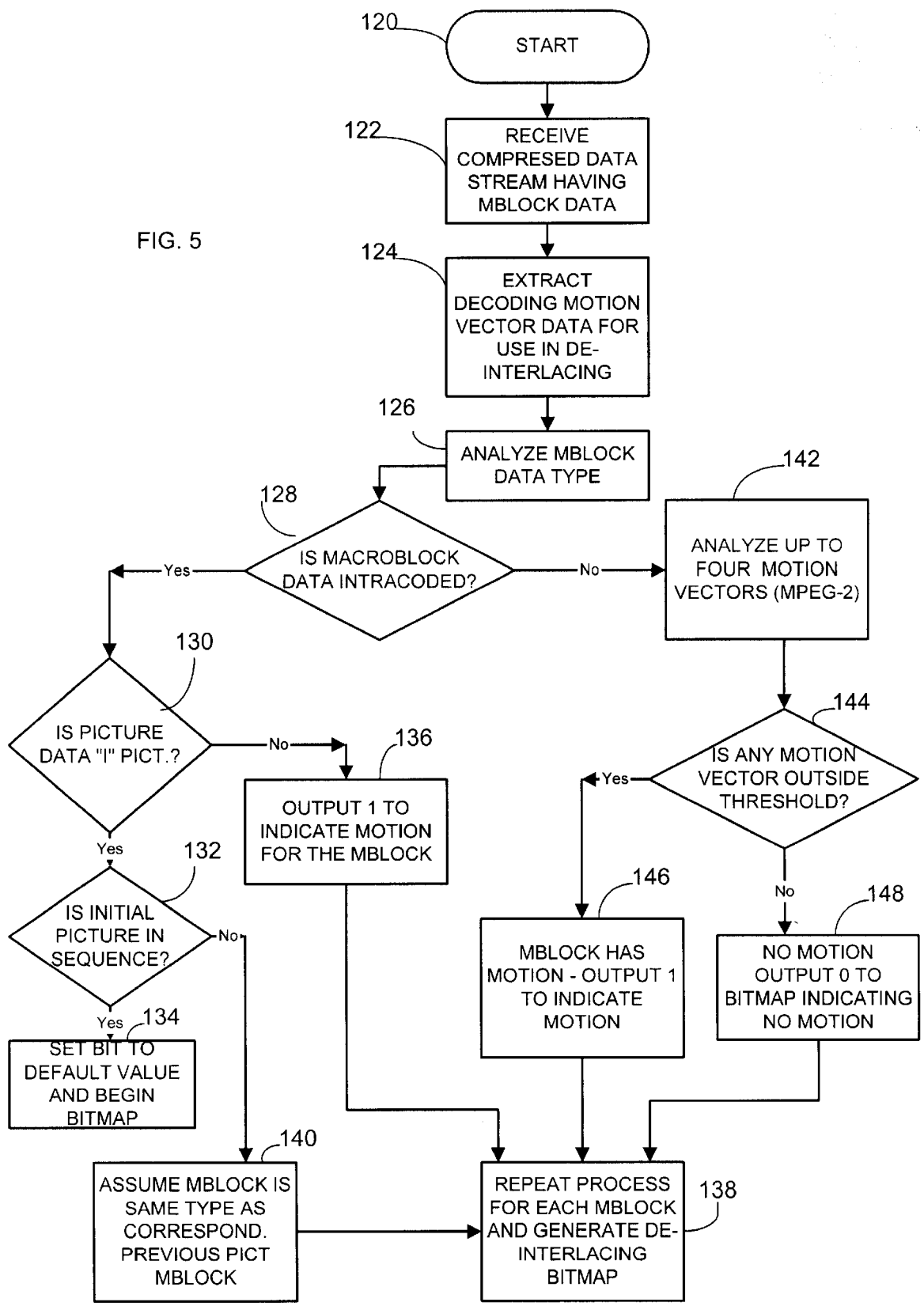
FIG. 5 is a flow diagram generally depicting a method for de-interlacing interlaced content for display on the progressive display device as carried out by the de-interlacing system shown in FIG. 4.

Referring to FIGS. 4 and 5, a more detailed description of the operation of the de-interlacing device 104 for an MPEG-2 video stream will now be discussed. The process starts in block 120 with the MPEG-2 de-interlacing device 104 enabled for operation. In block 122, the MPEG-2 decoder stage 106 receives MPEG-2 compressed data stream with macroblocks of data through decoder 107. As with conventional MPEG-2 decoders, the decoding motion vector data is extracted as shown in block 124. The decoding motion vector data is used in a conventional manner to decompress macroblock of data, but unlike conventional MPEG-2 decoders, is also routed to the motion vector based de-interlacing determinator 108 for use in de-interlacing. The MPEG-2 decoder 106 analyzes a subset 112 of the macroblocks of data to determine the type of macroblock received as shown in block 126. Analyzing preferably takes place in the motion vector based de-interlacing determinator 108. Each macroblock is analyzed to determine whether or not it contains motion. The process begins at block 128 where a macroblock type code bit in the video stream is read to determine if the macroblock of data is intracoded.

As a preliminary operation, the motion vector based de-interlacing determinator 108 checks to see from the video bit stream whether the macroblock picture data is an "I" picture as shown in block 130. This is because in MPEG-2 video streams, if a macroblock is intracoded and defined as an "I" picture, there is no data for that macroblock that could suggest whether there is motion in the macroblock. All macroblocks in "I" pictures are intracoded. Also, the determinator 108 must determine whether or not the "I" picture is the initial picture in a sequence as shown in block 132.

If the macroblock of data is intracoded and is in the initial picture in the sequence of an "I" picture, an initialization bit is set as shown in block 134 and bitmap data generation is started. If the macroblock of data is intracoded and the picture data is not "I" picture information, a 1 is set in the bitmap for this macroblock to indicate motion as shown in block 136. The process is repeated for each macroblock until the complete motion vector based de-interlacing bitmap data is finalized as indicated in block 138. If the macroblock of data is intracoded and it is an "I" picture but is not an initial picture in a sequence, then the motion vector based de-interlacing determinator 108 assumes that the macroblock of data is the same type as a corresponding previous picture macroblock as shown in block 140.

Other picture types in an MPEG-2 based system include "P" pictures and "B" pictures. The "P" pictures have macroblocks that are either intracoded or forward predicted. The "B" pictures have macroblocks that are intracoded, forward predicted, backward predicted or forward and backward predicted. If the macroblock is not intracoded, a motion vector based de-interlacing determinator 108 analyzes up to four motion vectors in an effort to determine whether or not motion has occurred in the instant macroblock as shown in block 142. Based upon the MPEG-2 standard, there can be up to four motion vectors depending on the type of motion prediction used by the encoder. In analyzing multiple motion vectors for de-interlacing purposes, the motion vector based de-interlacing determinator 108 checks to see if any motion vectors are outside a preset threshold as shown in block 144. The threshold may be set in software to any suitable level. However, it is preferred that the threshold is 1 indicating that any motion will set the bit. If any of the motion vectors are outside the preset threshold, the macroblock is determined to have motion and a 1 is written into the bitmap for that macroblock as shown in block 146. In block 148, if no motion vectors are outside the threshold, a 0 is output to the bitmap for that macroblock to indicate there is no motion. Hence, analyzing decoding motion vector data includes designating the block of data as having motion in response to a comparison of whether the decoding motion vector data is outside of a predetermined threshold.

Figure 6:
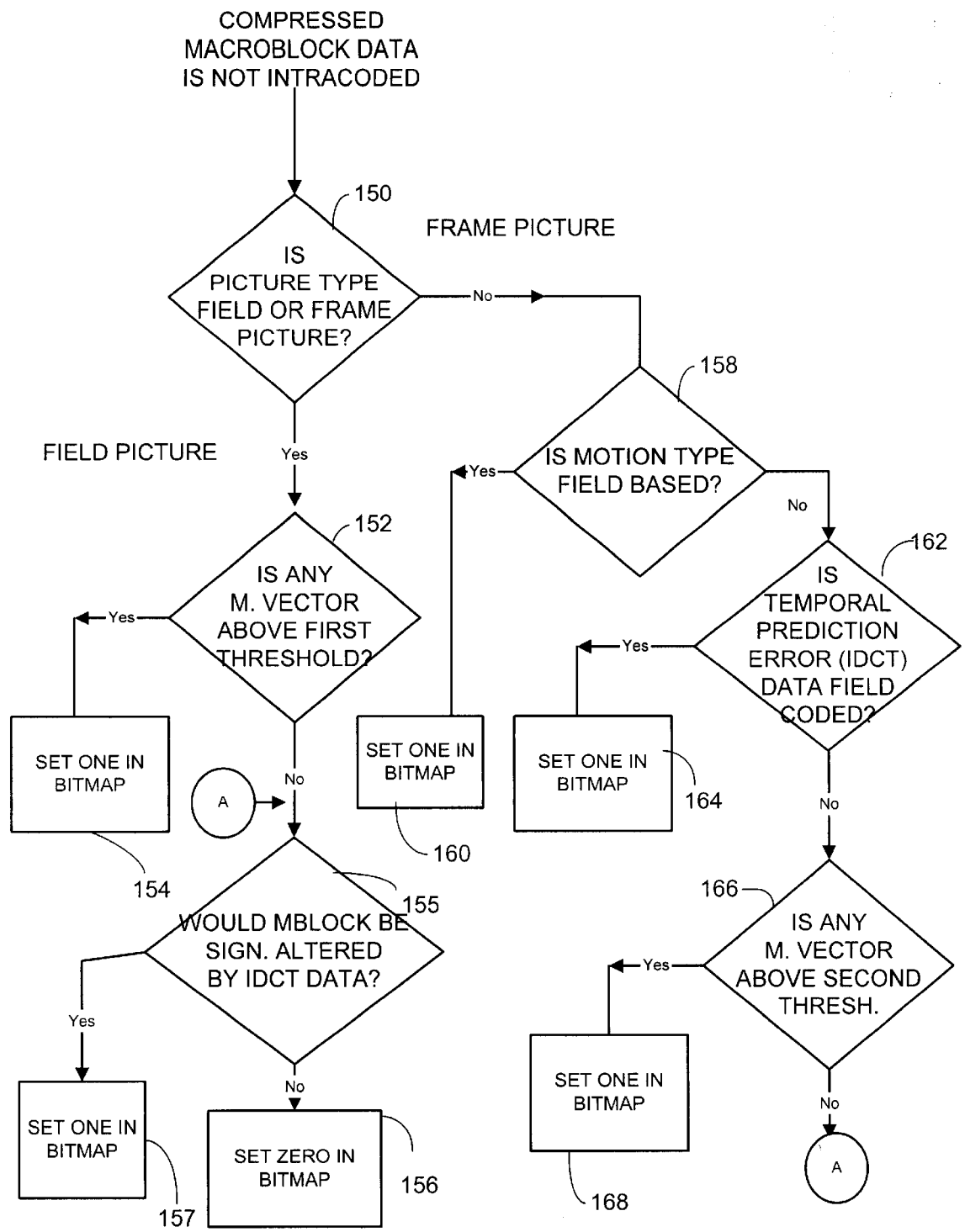
FIG. 6 is a flow diagram depicting in more detail steps shown in FIG. 5 for analyzing macroblock of data that are not intracoded.

FIG. 6 shows a more detailed flow diagram of the steps taken by the motion vector based de-interlacing determinator when the compressed macroblock of data is not intracoded. When the compressed macroblock of data is not intracoded, the picture type bit information from the video stream is evaluated as shown in block 150 to determine whether the picture type is a field picture or a frame picture. If the picture type bit information indicates that the picture data is field picture data, the decoder 104 determines whether any motion vector is above a first preset threshold as shown in block 152. The first threshold is preferably 1 indicating any motion sets the bit. If the motion vector is above this preset threshold, a 1 is set in the bitmap to indicate that the macroblock contains motion as shown in block 154. If however, the motion vector data is below the first threshold for the picture field, a subset of the macroblock data, namely temporal prediction error data (IDCT data) also referred to as difference data, is evaluated to determine confidence data indicating the degree to which the referenced data has motion with respect to the existing block, as shown in block 155. When coded, the temporal prediction error data is obtained as a result of inverse discrete cosine transformations (IDCT). The confidence data is also used to determine a suitable method for de-interlacing.

The confidence level determination may be done by calculating an average absolute value of difference data for each pixel. Other methods may also be used. If the macroblock data would be significantly altered by the IDCT data, a 1 is set in the bitmap indicating that there is not motion for the macroblock as shown in block 157. If the confidence level data indicates that the referenced data would not materially alter the picture, a 0 is set in the bit map as shown in block 156. It will be recognized that other suitable information may also be used to determine a confidence level that the referenced data is suitable for de-interlacing.

Returning to block 150, if the MPEG-2 stream picture type is a frame picture, additional bits in the video stream are checked to see if the motion type is field based as indicated in block 158. If the motion type is field based a 1 is set in the bitmap to indicate that there is motion for the frame picture having motion that is field based as shown in block 160. If however, the motion type is not field based, the MPEG-2 decoder 104 determines whether other information in the video stream can be used, namely whether the difference between the predicted value and the actual value known as temporal prediction error data, is field coded as shown in block 162.

If the temporal prediction error data is field coded, a 1 is set in the bitmap to indicate motion is detected. In other words, the system assumes that because the IDCT data is field coded there is likely motion in the macroblock as indicated in block 164. If the temporal prediction error data is not field coded however, the decoder 104 determines whether any motion vector is above a second threshold that is shown in block 166. It is preferred that this second threshold is about 1. When a motion vector is above the second threshold, the decoder determines that the macroblock has motion and sets a 1 in the bitmap as shown in block 168. If the motion vector is below the second threshold, confidence data can be determined as shown in blocks 155–157. The confidence data may also be used after other thresholds have been evaluated, such as in FIG. 5 between blocks 144 and 148.

Figure 7:
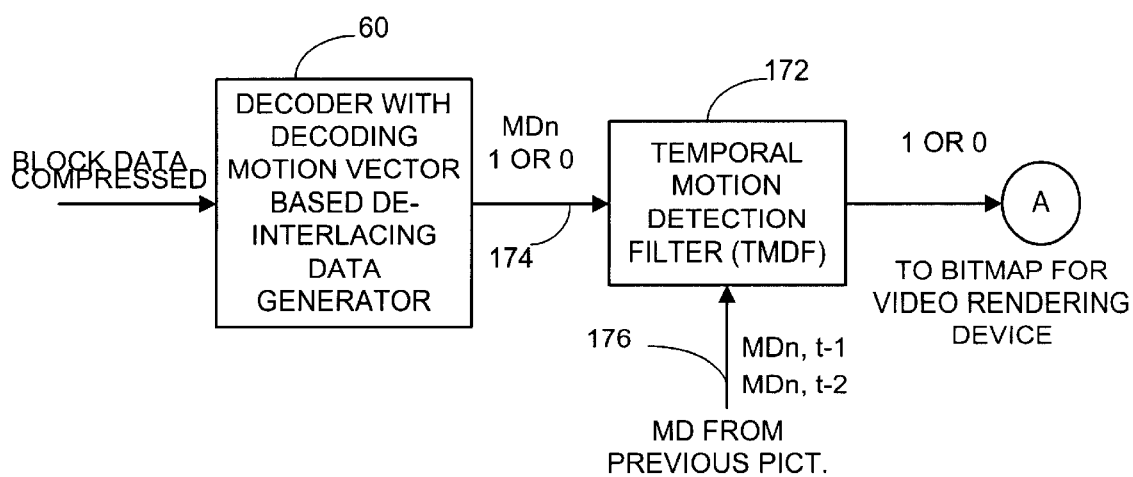
FIG. 7 generally illustrates a temporal motion detection filter having a median filter for an additional detection stage in accordance with another embodiment of the invention.

FIG. 7 shows an additional detection block 172 for use in the determinator to help eliminate an undesirable alteration between a determination of motion and a determination of no motion when the decoding motion vectors are close to the threshold. In essence, the additional detection block 172 is a temporal motion detection filter (TDMF) that compares bitmap data (two bits) from two previous pictures to the corresponding bitmap data from the current picture. Of these three bits, the TDMF 172 uses a median filter to determine a final bit value in the bitmap for the current picture.

As shown, the TIDMF 172 receives the a bit 174 from the decoding motion vector based de-interlacing determinator (motion detector stage) 60 and two other bits 176 from stored corresponding bitmap data from the previous picture and the corresponding bitmap data from the picture two pictures prior to the current picture. In operation, the additional detection block 172 has a conventional median filter that compares the three bits of motion detection to determine whether two or more of the three bits are a "1" or a "0." Where two or more of the bits are a "1" indicating motion was in at least two of the last corresponding picture frames, a "1" is output to the bitmap for use by the video rendering device. Where two or more of the bits are a "0", a "0" is output to the bitmap indicating no motion, for use by the video rendering device. The TDMF 172 helps correct for random fluctuations in the bitmap data.

Once the motion vector based de-interlacing bitmap is complete, the video rendering device applies an adaptive motion filtering algorithm for de-interlacing includes de-interlacing block of data for display on the progressive display device by inserting picture data line information from the corresponding opposite parity picture (even or odd) into vacant lines in a current block of data that has no motion resulting in a "weave" de-interlacing mode. Where the bitmap data indicates that the current macroblock contains motion, the video rendering device uses adaptive motion filtering to selectively de-interlace the current macroblock by linear averaging the existing picture line data to generate missing line data. This results in one form of "bob" de-interlacing. Other types of known algorithms may also be used, such as line repetition and edge-adaptive spatial interpolation. In summary, de-interlacing device 104 selectively de-interlaces each macroblock using pre-existing decoding motion vector information for two purposes. One to decompress picture data and the other to determine motion to select a proper de-interlacing technique.

Figure 8:
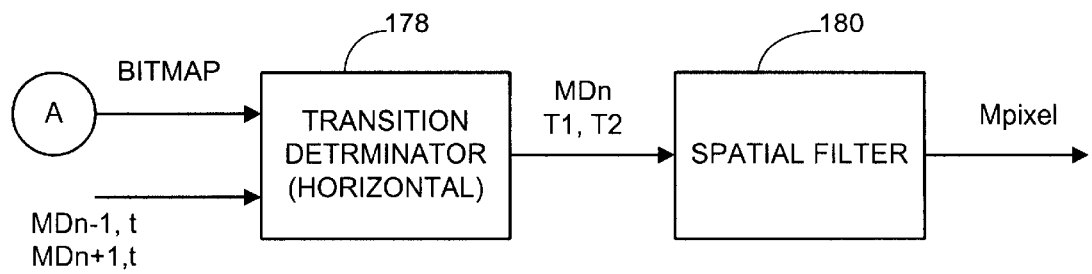
FIG. 8 generally depicts a system for transitioning between differing de-interlacing methods on horizontally related macroblocks in accordance with the invention.

FIG. 8 shows another embodiment of the invention that further improves picture quality wherein a de-interlacing transition determinator stage provides for a smoother transition between motion based and non-motion based methods of de-interlacing for horizontally adjacent macroblocks of data in a picture frame. Preferably, the bitmap data generated from the TMDF 172 serves as input to a de-interlacing transition determinator stage 178. However, it will be recognized that the output from the motion determinator 60 can also serve as the input to the transition determinator 178. In addition, to the bitmap data, motion detection values (bits) from adjacent preceding macroblock (MDn–1) and, motion detection values (bits) from a following macroblock (MNDn+1) in the horizontal direction serve as inputs to the de-interlacing transition determinator stage 178.

The de-interlacing transition determinator stage 178 compares the motion detection bit data from the horizontally adjacent current, previous and following macroblocks to determine whether a transition from motion to no motion has occurred in horizontally neighboring macroblocks. The de-interlacing transition determinator stage 178 generates three bits as outputs. One transition bit (T1) indicates that the state of motion in a horizontally preceding macroblock is different from the state of the current macroblock. Another transition bit (T2) indicates that the state of a horizontally following macroblock is different from the state of the current macroblock. Based on whether a transition has occurred, a pixel modification stage 180 blends pixels along edges of macroblocks to smooth out the transition of pixel changes based upon changes in de-interlacing techniques.

The pixel modification stage 180 modifies pixels based upon the following formula:

Mpixel=ALPHA $V1$+(1−ALPHA)$V2$ where V1 is calculated as MDn=0 and V2 is calculated as MDn=1, and ALPHA $\epsilon[0,1]$. The value V1 is calculated as if the block has no motion indicating merged pixel de-interlacing. The value V2 is the value of the same pixel as if intraframe de-interlacing is necessary.

Figure 9:
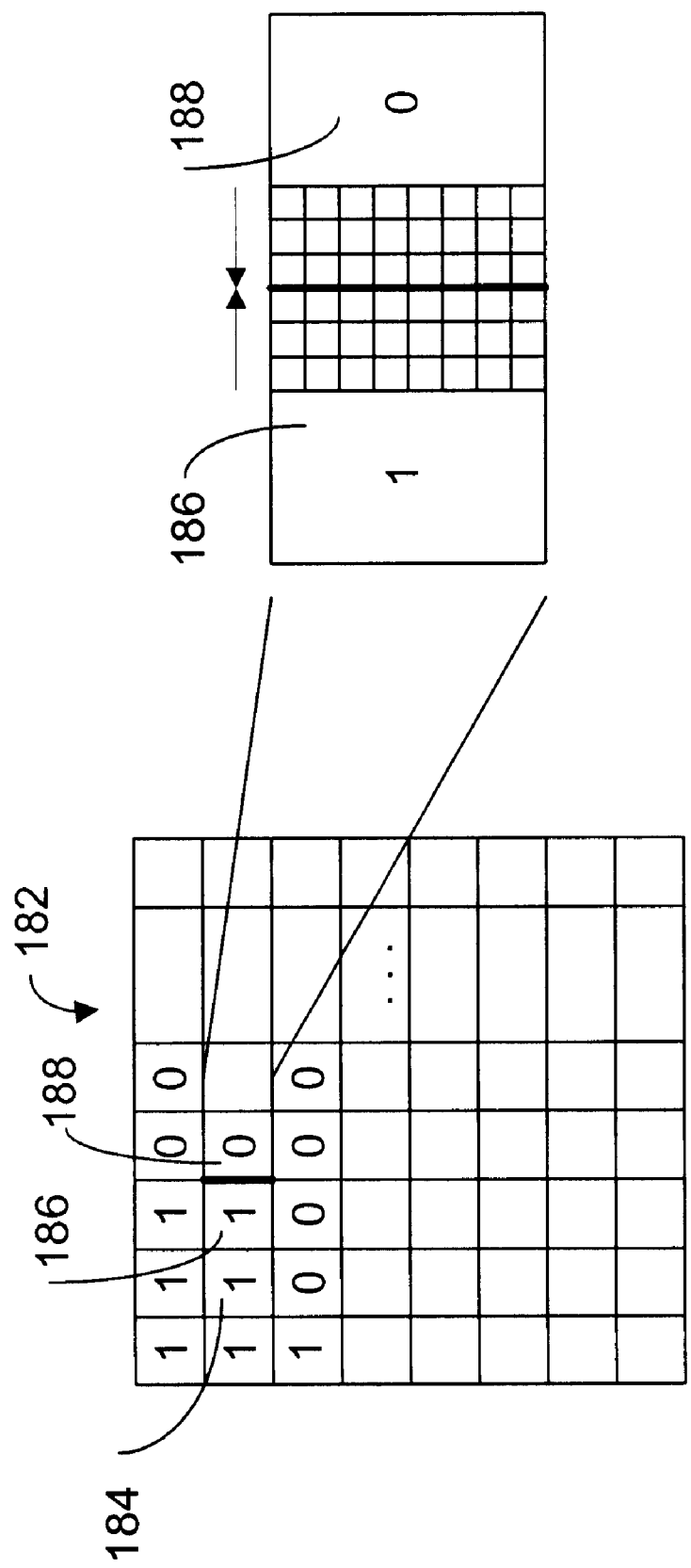
FIG. 9 depicts an example of pixel modification in adjacent macroblocks generated by differing interlacing methods to smooth a transition between macroblocks in accordance with the invention.

For example, as seen in FIG. 9, a bitmap representing macroblock motion/non-motion status 184 for a picture is shown 182. There is a transition between horizontally adjacent macroblocks 186 and 188. An enlarged view of these macroblocks of pixel data shows where the pixels are blended. Because macroblock 186 contains motion, a bob algorithm is used for the lines. However, those pixels along a boundary between transitional macroblocks are blended by weighting values of each of the Y, Cr and Cb luminous (or chromonous) components according to which macroblock they are in. Those pixels around the boundary in the motion macroblock are gradually changed to appear as if they underwent merging de-interlacing (no motion) the closer the pixels are to the boundary. In contrast, those pixels in the non-motion macroblock are weighted to appear as though they underwent increasing intraframe interlacing the closer the pixels are to the boundary. A de-interlacing gradient appears as shown by the arrows 190 such that pixels toward the center of block 186 are weighted to effect more of a motion type de-interlacing technique whereas the pixels toward the center of block 188 are weighted to effect more of a non-motion type de-interlacing technique.

It should be understood that the implementation of other variations and modifications of the invention in its various aspects will be apparent to those of ordinary skill in the art, and that the invention is not limited by the specific embodiments described. For example, the disclosed methods and devices may be used in DBS, DVD and other video systems using compressed video streams. Also, the disclosed process and devices may be used in more complex video streams that include additional parameters such as MPEG-2 SNR, Spatial and High profiles. Also, it is contemplated that the bitmap data can be other than binary bitmap data, such that for each macroblock there are more bits indicating the degree of motion. It is therefore contemplated to cover by the present invention, any and all modifications, variations, or equivalents that fall within the spirit and scope of the basic underlying principles disclosed and claimed herein.

What is claimed is:

1. A method for displaying interlaced content on a progressive display device comprising the steps of:

receiving a compressed data stream of encoded interlaced picture data having decoding motion vector data and picture data in the form of block of data;

extracting the decoding motion vector data from the compressed data stream for use in selecting, prior to a deinterlacing process, at least one of a plurality of adaptive motion filtering algorithms for de-interlacing decompressed picture data; and selectively de-interlacing the interlaced picture data on a block of data basis by analyzing the decoding motion vector data and at least a subset of the block of data, by selecting at least one of a plurality of adaptive motion filtering algorithms based on analyzed decoding motion vector data and at least a subset of the block of data, and by applying at least one of a selected plurality of adaptive motion filtering algorithms to the interlaced picture data for display on the progressive display device wherein the adaptive motion filtering algorithms employ separable temporal and non-temporal filtering.

2. The method of claim 1 wherein selectively de-interlacing by analyzing the decoding motion vector data and at least a subset of the block of data includes analyzing the decoding motion vector to determine whether an associated block of data contains picture data that has motion and further analyzing block mode data in the subset of the block of data to determine whether the block of data is intracoded and designating the block of data as having motion.

3. The method of claim 2 wherein analyzing decoding motion vector date includes designating the block of data as having motion in response to a comparison of whether the decoding motion vector data is outside of a predetermined threshold.

4. The method of claim 1 wherein applying at least one of the selected plurality of adaptive motion filtering algorithms for selectively de-interlacing includes the step of de-interlacing block of data for display on the progressive display device by inserting picture data line information from a corresponding opposite parity picture into vacant lines in current block of data that has no motion.

5. The method of claim 1 wherein applying at least one of the selected plurality of adaptive motion filtering algorithms for selectively de-interlacing includes the step of de-interlacing block of data for display on the progressive display device by linear averaging of existing picture line data to generate missing lines.

6. The method of claim 1 wherein applying at least one of the selected plurality of adaptive motion filtering algorithms for selectively de-interlacing includes the step of de-interlacing by applying a first selected adaptive motion filtering algorithm for a first block of data containing motion and a second selected adaptive motion filtering algorithm for a second block of data determined to contain no motion.

7. The method of claim 1 further including the step of determining transitions between horizontally adjacent blocks of data by comparing motion detection bit data from horizontally adjacent current, previous and following blocks of data to determine whether a transition from motion to no motion has occurred and modifying pixel information to blend pixels around a boundary of the block of data transition.

8. The method of claim 1 wherein the subset of block data includes confidence data indicating a predetermined confidence level that referenced block of data, to determine a suitable method for de-interlacing, is suitable for de-interlacing.

9. The method of claim 3 wherein the step of designating the block of data includes generating a motion vector based de-interlacing bitmap containing bit information indicating at least one of the plurality of adaptive motion filtering algorithms and whether each block contains motion or no motion.

10. The method of claim 1 wherein the compressed data stream is an MPEG-2 bit stream.

11. The method of claim 8 wherein the block of data is a macroblock and the subset of the macroblock data is IDCT data evaluated to determine confidence data indicating the degree to which referenced data has motion with respect to a macroblock.

12. The method of claim 1 wherein the step of selectively de-interlacing includes the step of generating a de-interlacing bitmap at least based on the motion vector by using a temporal motion detection filter (TDMF) that compares an output from a decoding motion vector based de-interlacing determinator and interlacing bit information from stored corresponding macroblock of data on a previous picture and corresponding macroblock of data on a picture, two pictures prior to the current picture, to determine a final bitmap value for use in de-interlacing.

13. A method for displaying interlaced content on a progressive display device comprising the steps of:

receiving an MPEG-2 compressed data stream of encoded interlaced picture data having decoding motion vector data and macroblock data wherein the picture data is made up of a plurality of macroblock data;

for each macroblock of data, extracting the decoding motion vector data from the compressed data stream for use in selecting, prior to a deinterlacing process, at least one of a plurality of adaptive motion filtering algorithms for de-interlacing decompressed picture data; and selectively de-interlacing the interlaced picture data on a macroblock of data basis by analyzing the decoding motion vector data and at least a subset of the block of data, by selecting at least one of a plurality of adaptive motion filtering algorithms based on analyzed decoding motion vector data and at least a subset of the block of data, and by applying at least one of a selected plurality of adaptive motion filtering algorithms to the interlaced picture data for display on the progressive display device wherein the adaptive motion filtering algorithms employ separable temporal and non-temporal filtering.

14. The method of claim 13 wherein the step of selectively de-interlacing includes the step of generating a motion vector based de-interlacing bitmap containing bit information indicating whether each macroblock of data contains motion or no motion.

15. The method of claim 14 wherein the plurality of adaptive motion filtering algorithms for selectively de-interlacing include linear averaging existing picture line data to generate missing lines for de-interlacing macroblock of data containing motion and merging by interlacing even and odd fields into a single frame for the macroblock of data containing no motion.

16. The method of claim 13 further including the step of transitioning between de-interlacing algorithms for horizontally aligned macroblock of data in a picture frame wherein one macroblock of data contains motion and an adjacent macroblock of data contains no motion.

17. The method of claim 16 further including the step of determining transitions between horizontally adjacent blocks of data by comparing motion detection bit data from horizontally adjacent current, previous and following blocks of data to determine whether a transition from motion to no motion has occurred and modifying pixel information to blend pixels around a boundary of the block of data transition wherein the step of transitioning includes weighting pixel information.

18. A device for use in displaying interlaced content on a progressive display device comprising:

means for extracting decoding motion vector data for use in selecting, prior to a deinterlacing process, at least one of a plurality of adaptive motion filtering algorithms for de-interlacing decompressed picture data, from a compressed data stream containing interlaced decompressed picture data made up of block of data;

means for receiving the motion vector data from the extracting means having block of data motion detection means for determining whether the block of data contains motion based on the decoding motion vector data; and means for selectively de-interlacing the interlaced picture data on a block of data basis having means for selecting at least one of a plurality of adaptive motion filtering algorithms by analyzing the motion vector data and at least a subset of the block of data and for applying at least one of a plurality of selected adaptive motion filtering algorithms to the interlaced picture data for display on the progressive display device wherein the adaptive motion filtering algorithms employ separable temporal and non-temporal filtering.

19. The device of claim 18 wherein the means for selecting by analyzing the motion vector data and at least a subset of the block of data generates a de-interlacing bitmap containing bit information indicating at least one of the plurality of selected adaptive motion filtering algorithms for de-interlacing each block of data and whether each block of data contains motion or no motion.

20. The device of claim 18 further including transition detection means for determining transitions between horizontally adjacent blocks of data by comparing motion detection bit data from horizontally adjacent current, previous and following blocks of data to determine whether a transition from motion to no motion has occurred and modifying pixel information to blend pixels around a boundary of the block of data transition.

* * * * *